Dec. 29, 1942.   V. YESULAITES   2,306,680
LOAD SUSPENSION MECHANISM
Filed Jan. 10, 1940
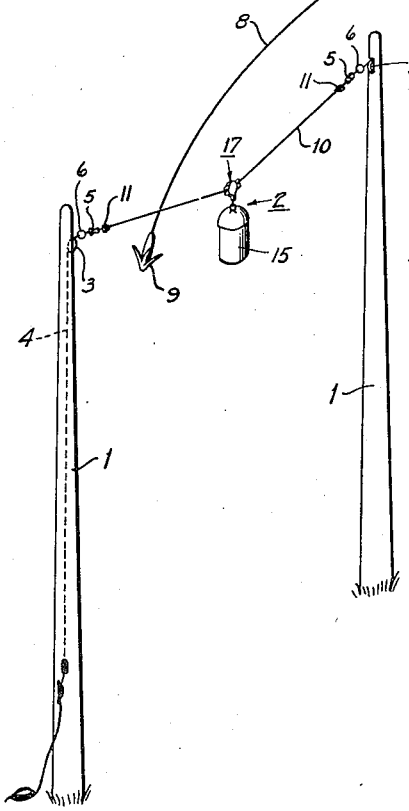
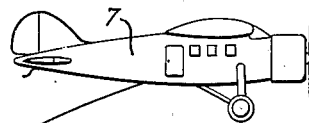
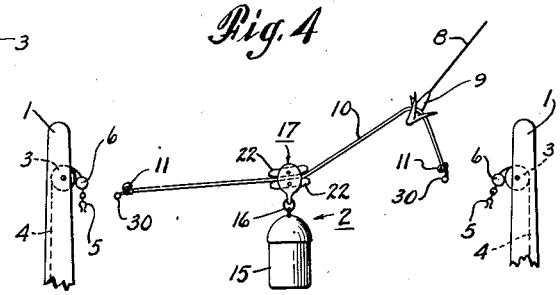
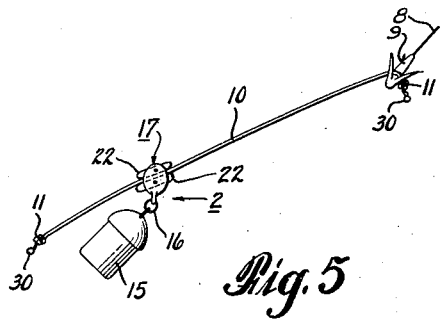
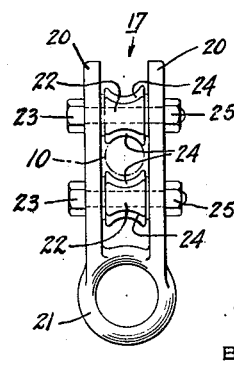
INVENTOR:
Victor Yesulaites,
BY
Albert M. Austin
ATTORNEY.

Patented Dec. 29, 1942

2,306,680

UNITED STATES PATENT OFFICE 2,306,680

LOAD SUSPENSION MECHANISM

Victor Yesulaites, Wilkes Barre, Pa., assignor to All American Aviation, Inc., Wilmington, Del., a corporation of Delaware Application January 10, 1940, Serial No. 313,235

4 Claims. (Cl. 258—1)

This invention relates to a load suspension mechanism and more particularly to an energy absorbing mechanism for suspending a load from a line, such as a rope or cable.

In certain instances it is desirable, when suspending a load or burden from a line, such as a rope or cable, to provide for absorbing the energy or shocks imparted to the line by certain operations incident to the use of the apparatus, as for example, accelerating the load from a position of rest. The present invention is directed to the provision of a suspension mechanism which will effectively provide such energy absorbing action.

One use to which the present invention is particularly well adapted is in the construction of an aircraft pick-up system. In certain types of aircraft pick-up systems, wherein the burden is picked up from a ground station while the aircraft is in flight, the load or burden is suspended by a suspension line suitably supported in position to be engaged by a grapple or the like lowered from the aircraft and the suspension line is attached to its supporting means by a connecting means which is releasable upon engagement between the grapple and the line. In such installation, it is desirable that at least a portion of the shock incident to accelerating the burden in the course of the pick-up operation be absorbed by the portion of the burden suspension mechanism which is carried away in the pick-up operation. Thus, it is not necessary to provide in the aircraft, or the line carrying the grapple, energy adsorbing means of sufficient capacity to absorb the entire shock of accelerating the burden. Consequently, substantial saving in space and/or weight is effected.

The present invention is directed to the provision of a suspending and energy absorbing mechanism for a burden which is capable of absorbing a substantial proportion of the shock resulting from the accelerating of the burden and more particularly to the provision of an energy absorbing hangar or glider, for attaching the burden to a suspension line, which is adapted to grip or clamp the line with a varying degree of force, whereby it permits the burden to slide along the line and thus be accelerated evenly and more gradually than would be the case if the burden were attached to the suspension line in a non-yielding and positive manner.

In one specific illustrative embodiment of the invention, the suspending and energy absorbing mechanism comprises a pick-up line having associated therewith a glider comprising a rigid frame, to which the burden is attached and through which the suspension line passes. A pair of jaws may be pivoted substantially at their center points in the frame and are normally spaced apart a distance sufficient to engage the suspension line yieldingly from opposite sides, and the jaws are thus maintained substantially in parallel condition. The jaws are free to turn under the influence of forces applied to the suspension line and burden and their dimensions and positions are so selected that their gripping effect upon the suspension line varies in accordance with the direction and intensity of such forces, but in no event is sufficient to prevent relative movement between said suspension line and said burden when the maximum force is applied thereto, thereby permitting the energy absorbing movement of the burden to take place when the suspension line is engaged by a grapple or like means.

An object of the present invention is the provision of a suspending and energy absorbing mechanism for a load or burden which is capable of absorbing certain shocks incident to operations upon the load or suspension line or both.

Another object of the invention is the provision of a suspending and energy absorbing mechanism for aircraft pick-up or pick-up and delivery systems, which is capable of absorbing some or all of the shock incident to the pick-up or pick-up and delivery of the burden.

Another object of the invention is the provision of an energy absorbing glider for attaching a burden to a suspension line which permits relative movement of the burden and the suspension line in accordance with the direction and intensity of forces applied to the burden or suspension line or both, but will not permit said burden and suspension line to be locked together when the maximum force is applied thereto.

Still another object of the invention is the provision of a simple and relatively inexpensive device for attaching a burden to a suspension line and constructed to provide a variation in the resistance to relative movement between the suspension line and the burden in accordance with certain operating conditions.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which:

Fig. 1 is a somewhat diagrammatic perspective view showing a ground installation for an aircraft pick-up system embodying the present invention and showing also an aircraft with its attached burden-transferring line about to engage the suspension line of the ground installation.

Fig. 2 is a side elevational view of an energy absorbing member constructed in accordance with the present invention and illustrating its relation to the suspension line when the latter is in condition to be engaged by the grapple;

Fig. 3 is an end elevational view of the device shown in Fig. 2;

Fig. 4 is a fragmentary, somewhat diagrammatic view illustrating the condition of the suspending and energy absorbing and associated supporting mechanism just after the suspension line has been engaged by the grapple on the burden-transferring line;

Fig. 5 is a somewhat diagrammatic view illustrating the condition of the suspending and energy absorbing mechanism after the burden has been accelerated substantially to the speed of the aircraft.

Like reference characters denote like parts in the several figures of the drawing.

Referring now particularly to Figs. 1 and 4 of the drawing, the ground station or installation comprises preferably a plurality of uprights or masts 1, 1 between which a burden suspending and energy absorbing mechanism 2 is suspended. Rotatably supported adjacent the upper ends of the masts 1, 1 are pulleys 3, 3 over each of which is trained a hoist line 4 carrying a releasing link 5 and a lowering weight 6. The releasing links 5, 5 are provided for attaching a suspension line 10 to the hoist lines 4, 4 and may comprise any suitable form of frangible or separable members of known construction capable of releasing the suspension line 10 when it is engaged by the burden transfer line 8 hereinafter described.

There is also shown in Fig. 1 an aircraft 7 provided with a burden transferring line 8 at the end of which is carried a grapple 9 adapted to engage the suspension line 10 when the aircraft is caused to pass over the ground station at a suitable height.

Suitable mechanism (not shown) may be located in or attached to the aircraft 7 for the purpose of drawing the burden transfer line and attached burden into the aircraft. Suitable mechanism (not shown) may also be provided for absorbing the shock occurring when the grapple 9 engages the suspension line 10. Any suitable shock absorbing means may be employed and therefore, it is not deemed necessary to describe this mechanism herein in detail.

The suspending and energy absorbing mechanism 2 comprises a suspension line 10 having at its ends members 30, 30 adapted to be releasably held by the releasing links 5, 5 and also having provided at its ends enlarged portions which may, for example, be constituted by knots in the line in the form of monkeys' fists 11.

A burden container 15 is suitably suspended from the suspending and energy absorbing mechanism 2 as by a link 16 or other means attached at one end to the burden container 15 and at the other end to a glider 17 of the suspending and energy absorbing mechanism 2.

The glider 17 is illustrated more in detail in Figs. 2 and 3 to which reference now is made, and comprises generally a frame having two spaced cheek plates 20 secured together in a suitable manner as by a ring 21 integral therewith. Jaws 22, 22 are freely pivoted between the cheek plates 20, 20 by suitable pivot members 23, 23 such as bolts, secured in position by nuts 25, 25. The jaws 22, 22 are provided with grooved top and bottom edges 24, as shown particularly in Fig. 3 for purpose hereinafter disclosed.

The jaws 22, 22 are so located and are of such width, that their opposing grooved edges are sufficiently spaced to accommodate the suspension line 10 and permit relatively free sliding movement of the glider 17 along the suspension line 10 when the jaws 22, 22 extend perpendicularly to a plane through their pivots. As stated above, the jaws 22, 22 are freely pivoted in the frame; however, owing to the fact that they are spaced apart a distance approximately equal to the diameter of the suspension line, the suspension line 10 tends to maintain them in mutually parallel condition. In the event that the angularity of the section of the suspension line within and adjacent the jaws changes with respect to the plane through the pivots, the effective spacing of the jaws is changed. For example, it will be seen that as the jaws are turned away from the position shown in Fig. 2, the spacing between them decreases and accordingly they grip or clamp the line 10, thus requiring a greater force to move the glider or hanger along the line 10.

The several portions of the apparatus, and particularly the portions of the suspending and energy absorbing mechanism, may be constituted by any material suitable for the functions of the several members respectively. The frame preferably may be metal and aluminum or a light metal alloy is generally preferable. The frame can be made either by casting, forging or in certain cases, may be built-up by welding. The jaws are made of metal, wood or a plastic such as a synthetic resin, but in any event, should be relatively unaffected by water so that they will not swell, or otherwise alter their operation owing to exposure to the weather. The several lines, and in particular, the suspension line, are preferably formed from light but relatively strong filamentary material, such as hard fibre rope, but in any event should be inherently water-repellent or suitably treated to prevent swelling or other changes owing to exposure to the weather.

One mode of operating the apparatus hereinbefore described is illustrated below for the purpose of assisting in an understanding of the invention. However, it will be understood that the apparatus is suitable for use in other types of installations and for other modes of operation.

The hoist lines 4, 4 are lowered to the ground, by the assistance of the weights 6, 6 and the suspension line 10, with the burden container 15 attached, is then connected to the hoist lines 4, 4 by means of the releasable links 5, 5. The glider 17 is positioned approximately at the midpoint of the suspension line 10 and the latter is then raised to its uppermost position as illustrated in Fig. 1 and is secured in this position by securing the hoist lines 4, 4.

Any force, such as that exerted by a cross wind tending to move the burden and glider from its position at the mid-point of the suspension line will be resisted by the turning movement imparted to the glider and the resulting tightening of the jaws against the suspension line.

When the suspension line is in the position shown in Fig. 1, the ground installation is in condition for the pick-up operation. The aircraft which is to pick-up the burden is flown over the ground installation with the burden-transferring line 8 trailing in such manner that the line 8 will strike the suspension line 10 and free it and slide over it until the grapple 9, engages the suspension line 10. The releasing links 5, 5 are adapted to release the suspension line 10 when the transfer line 8 contacts the suspension line 10. The engagement of the grapple 9 with the suspension line 10 would produce a substantial shock to the aircraft owing to the inertia of the suspending mechanism and attached burden and the high speed of the aircraft. A portion of the shock incident to accelerating the suspension mechanism preferably is dissipated by the shock-absorbing mechanism (not shown) within the aircraft, but this ordinarily is insufficient to absorb all of the shock.

When the grapple 9 engages the suspension line 10, a sudden turning movement is imparted by the rope to the jaws 22, 22 in either a clockwise or counter-clockwise direction, depending upon whether the grapple engages the suspension line 10 to the left or to the right of the burden conveyor 15, as viewed in Fig. 4 of the drawings. Thus, the jaws 22 are suddenly moved toward each other and grip the suspension line 10, more firmly thus restricting relative movement between the suspension line 10, and the glider 17 with its attached burden 15.

The suspending and energy absorbing mechanism 2 is acted upon by an initial accelerating force when the transfer line 8 strikes the suspension line 10. This shock, however, is absorbed at least to some extent by the shock absorbing mechanism in the aircraft.

During this initial acceleration, a velocity is imparted to the burden container 15 in the direction of travel of the suspension line 10, whereby the tendency of the suspension line 10 to turn the jaws 22, 22 of the glider 17 out of perpendicularity with respect to a line through their pivots is limited thereby preventing the glider 17 from being locked with the suspension line 10. The glider 17 is thus permitted to slide slowly along the suspension line 10 (see Fig. 5).

Thus, after the initial acceleration, the shock of which is taken up by the shock absorber in the aircraft, a more gradual acceleration is accomplished owing to the slip of the glider along the suspension line and any shock which might be transmitted to the aircraft by the subsequent acceleration of the burden is practically eliminated.

As the burden container 15 is further accelerated, it tends to attain the velocity of the suspension line 10 and the tendency to slide along the suspension line 10 decreases. The distance between the jaws 22, 22 and the length of the jaws relative to the diameter of the suspension line 10, are so selected that the tendency of the burden 15 to slide relative to the suspension line 10 decreases more rapidly than does the gripping effect of the jaws on the suspension line 10, and consequently, the glider 17 tends to cease movement along the suspension line prior to the time it reaches the end of the suspension line remote from the grapple. However, in event, the sliding movement is not completed before the glider 17 reaches the end of the suspension line, the knot 11 will prevent the glider from being disengaged from the suspension line.

The transfer line 8, grapple 9, and suspending and energy absorbing mechanism 2 is drawn into the aircraft by suitable means and the suspending and energy absorbing mechanism with its attached burden is detached from the grapple whereafter the load transferring line 8 with the grapple 9 can again be paid out ready for another pick-up operation.

While the present invention has been described in connection with a pick-up operation, nevertheless, it will be understood that the suspending and energy absorbing mechanism herein described may be employed also for the purpose of delivering a load or burden at a delivery station or at both a pick-up and delivery station.

While certain novel features of the invention have been disclosed and have been pointed out in the annexed claims, it will be understood that various omissions, substitutions, and changes may be made by those skilled in the art without departing from the spirit of the invention.

What is claimed is:

1. In an aircraft pick-up and delivery system, the combination with a burden, a suspension line and means including a releasing connection for supporting said suspension line in burden-suspension position, of a glider engaging said suspension line for suspending said burden therefrom, said glider including a frame, spaced rope engaging jaws, and means pivoting said line engaging jaws to said frame centrally of said jaws in position to engage said line from opposite sides and to exert a clamping effect thereon in accordance with the angular position of said jaws relative to said frame, but not sufficient to prevent relative movement between the suspension line and the glider when the resistance therebetween is at a maximum.

2. In an aircraft pick-up and delivery system, the combination with a burden, a suspension line, and means including a separable connection for supporting said suspension line in burden suspending position, of a glider engaging said suspension line for suspending said burden therefrom, said glider including a frame and spaced jaws centrally pivoted to said frame in position to engage said suspension line with a variable grip thereon in accordance with the direction and intensity of forces on said line and said frame.

3. In an aircraft pick-up and delivery system, the combination with a burden and a suspension line, of a glider connected to said burden and engaging said suspension line for suspending said burden therefrom, said glider including a frame and spaced jaws pivoted to said frame adjacent their central point whereby said burden is slidably connected to said suspension line with a varying gripping force determined by the relative angular disposition of said suspension line and said burden.

4. An aircraft pick-up and delivery system comprising a burden line, a plurality of spaced uprights, hoist lines on said uprights, releasable connecting means on the ends of said hoist lines, means on said burden line adapted to be releasably held by said means on said hoist lines, said burden line adapted to be releasably held in horizontal suspended position by said hoist lines, a burden container, means associated with said burden container and connecting said burden container to said burden line, said means comprising a frame member, spaced pivoted jaw members in said frame adapted to receive said burden line therebetween and exert a restricting action on said burden line, whereby to restrict relative movement between said burden line and said burden container when a predetermined force is applied to said burden line but not to prevent relative movement therebetween when said force is at a maximum.

VICTOR YESULAITES.